Dec. 13, 1949 E. S. COOK 2,490,997
BRAKE CYLINDER PRESSURE CONTROL APPARATUS
Filed Oct. 25, 1947 2 Sheets-Sheet 2
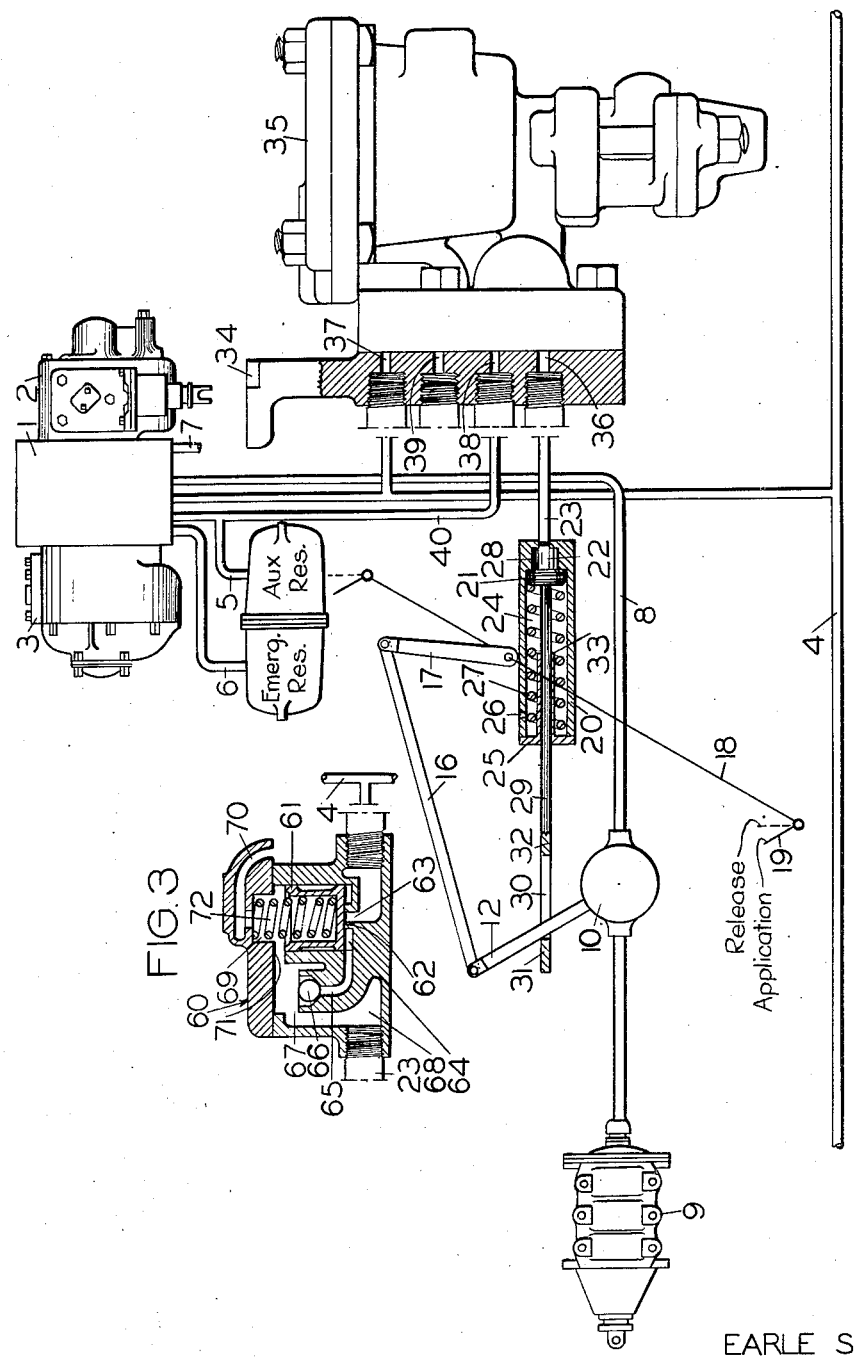
INVENTOR.
EARLE S. COOK
BY Frank E. Miller
ATTORNEY Patented Dec. 13, 1949

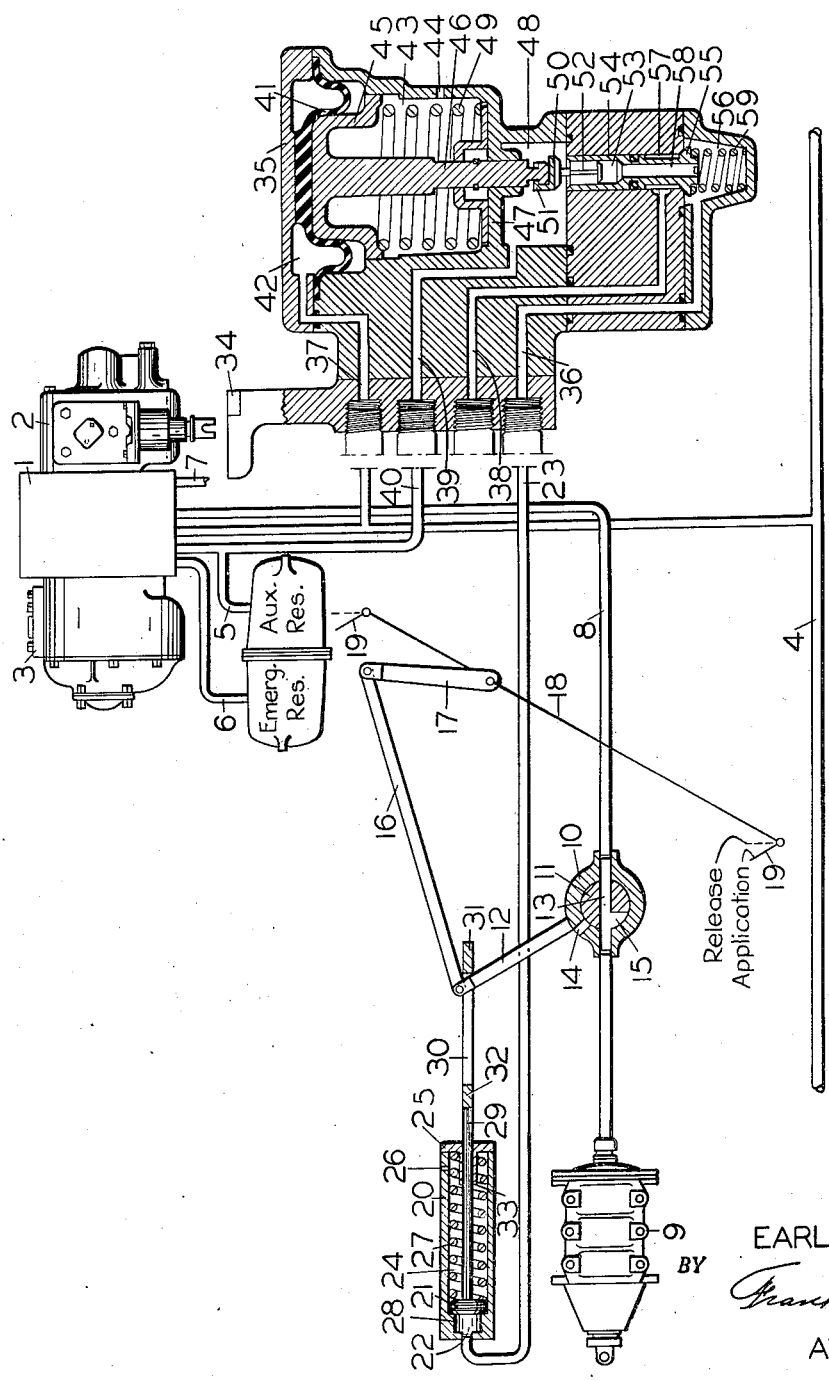

2,490,997

UNITED STATES PATENT OFFICE 2,490,997

BRAKE CYLINDER PRESSURE CONTROL APPARATUS

Earle S. Cook, Forest Hills, Pa., assignor to The Westinghouse Air Brake Company, Wilmerding, Pa., a corporation of Pennsylvania Application October 25, 1947, Serial No. 782,147

11 Claims. (Cl. 303—68)

1

This invention relates to automatic fluid pressure brake equipment, such as the AB type, for railway vehicles, and more particularly to means for releasing and reapplying by fluid under pressure the brakes on a vehicle with the brake pipe completely vented.

When a vehicle provided with such equipment and having the reservoir or reservoirs thereof charged with fluid under pressure is cut out of a train for switching operation, inspection of the brake equipment or the like, the brake pipe is completely vented and the brake controlling valve device will move to emergency position and establish communication between said reservoir or reservoirs and the brake cylinder device, whereupon the pressure of fluid in said reservoirs will equalize into said brake cylinder device and effect an emergency application of the brakes on the vehicle.

To permit movement of the vehicle for switching purposes it is then necessary to release the fluid under pressure from the brake cylinder device and it is desirable to effect such release without dissipating the fluid pressure still remaining in the reservoir or reservoirs. Further, if on inspection, adjustment of the brake equipment is found desirable, such as in case of excessive brake cylinder piston travel or renewal of brake shoes, it is also necessary to release the fluid under pressure from the brake cylinder device to effect the adjustment or for replacing the brake shoes and to then resupply fluid under pressure to the brake cylinder device to reapply the brakes for checking the adjustment.

One object of the invention is therefore the provision of an improved release and application valve mechanism for use on railway vehicles and which is adapted to be operated manually by a trainman, either while riding the vehicle or from the ground, and with the brake pipe completely vented, for releasing the fluid under pressure from the brake cylinder device on the vehicle without losing the fluid pressure still remaining in the reservoir or reservoirs thereon, and for reapplying the brakes, if necessary or desirable, by supplying fluid under pressure thus retained in said reservoir or reservoirs to the brake cylinder device.

If the brake release and application valve mechanism is in its brake release position for releasing fluid under pressure from the brake cylinder device at the time a vehicle is cut into a train, it is desirable, upon recharging of the brake equipment on the vehicle through the brake pipe, that said mechanism automatically

2 return to its normal condition for reconnecting the brake cylinder device to the brake controlling valve device to permit normal control of the brakes on the vehicle by said brake controlling valve device, and another object of the invention is the provision of such a mechanism which will automatically operate in this manner.

Other objects and advantages will become apparent from the following more detailed description of the invention.

In the accompanying drawings; Fig. 1 is a diagrammatic view, partly in section and partly in outline, of a fluid pressure brake equipment embodying one form of the invention; Fig. 2 is a similar view embodying a different form of the invention; and Fig. 3 is a diagrammatic view of a third form of the invention.

*Description*

As shown in the drawings, 1 designates the pipe bracket of an AB control valve, the service portion is indicated by 2 and the emergency portion by 3. 4 designates the brake pipe connected to the AB control valve, and 5 and 6 designate pipes connecting, respectively, the auxiliary and emergency reservoirs to the AB control valve. 7 designates the brake cylinder release pipe of the AB control valve adapted to be connected to the usual pressure retaining valve device (not shown), and 8 designates the brake cylinder or application and release pipe connected to said control valve and adapted to be connected to the brake cylinder device 9.

All of the parts so far described are of known construction, the AB control valve being standard on American railroads.

Interposed in the brake cylinder pipe 8 between the AB control valve and the brake cylinder device 9 is a brake release and application valve device 10 which, for the purpose of illustration, comprises a casing containing a plug valve 11 having a brake application position, in which it is shown in Fig. 1 of the drawing, and a brake release position and adapted to be turned to either of said positions by a lever 12. In the plug valve 11 is a port 13 arranged in the brake release position to establish communication through pipe 8 to permit flow of fluid under pressure in the direction from the AB control valve to the brake cylinder 9 for effecting an application of brakes on a vehicle and in the reverse direction from said brake cylinder device through said control valve for releasing the brakes on the vehicle in the well-known manner. In the brake release position of the plug valve 11, in which position communication between the AB control valve and the brake cylinder device 9 is closed, the port 13 is adapted to register with an atmospheric port 14 in the casing of the plug valve, while a cavity 15 in said valve, constantly open to port 13, is adapted to register with the portion of pipe 8 open to brake cylinder device 9 for thereby opening said brake cylinder device to atmosphere.

The lever 12 is connected by a link 16 to one end of a lever 17 the other end of which is secured to a shaft 18. The shaft 18 is adapted to extend from side to side of the vehicle and on each of its opposite ends there is provided a handle 19 for operation by a trainman either while riding the vehicle or from the ground. The handles 19 have two positions, namely, a release position and an application position, as indicated in the drawing by appropriate legends. Upon movement of either handle 19 to its release position the levers 17 and 12 will be operated to turn the plug valve 11 to its brake release position, while upon movement of either handle to its application position said levers will operate said plug valve to its application position.

A mechanism 20 is provided for automatically moving the brake application and release valve device 10 to its brake application position upon charging of the brake pipe 4, and thereby the brake equipment on the vehicle, and for permitting manual movement of said valve device by lever 12 to its different positions when the brake pipe is vented.

The mechanism 20 is preferably in the form of a casing or cylinder containing a piston 21 subject on one side to pressure of fluid in a pressure chamber 22 which is open to a pipe 23. A non-pressure chamber 24 is provided between the opposite side of piston 21 and a non-pressure head 25 and is constantly open to atmosphere as by way of a port 26 in the cylinder. A spring 27 contained in the non-pressure chamber 24 acts on the piston 21 for urging it into contact with a stop 28. A stop 33 extends from the non-pressure head 25 into chamber 24 for limiting movement of piston 21 against spring 27. A rod 29 connected at one end to the piston 21 extends therefrom through the non-pressure chamber 24 and non-pressure head 25 and outside of said cylinder, said rod is provided with transverse parts 31 and 32 defining opposite end walls of a slot 30 in which the plug valve operating lever 12 is disposed.

When the pressure chamber 22 and pipe 23 are void of fluid under pressure, in the structure shown in Fig. 1, spring 27 is adapted to move the piston 21 into contact with stop 28 and thereby actuate rod 29 and part 31 thereof to pull the operating lever 12 and plug valve 11 to and then hold them in their normal or brake application position, in which they are shown in the drawing, if such parts are not already in said position. Upon supply of fluid under pressure to pipe 23 and pressure chamber 22 the piston 21 will move against spring 27 into contact with stop 33 for actuating rod 29 relative to the plug valve operating lever 12 to a position in which the part 32 of said rod may just contact said lever when in its normal or application position, the slot 30 being of such length that with the piston 21 against the stop 33 the lever 12 and plug valve 11 can be moved by either operator's handle 19 to either of its different positions.

In the structures shown in Figs. 2 and 3 the cylinder 20 is arranged just opposite to that shown in Fig. 1, so that when the piston 21 is moved into contact with stop 33, as will occur upon supply of fluid under pressure to the pressure chamber 22 and pipe 23, the part 32 of the rod 29 will engage the cock operating lever 12 and move it to its normal or application position and then hold same against movement out of said position by either handle 19. However, upon release of fluid pressure from pressure chamber 22 and pipe 23 the piston 21 will be moved into contact with stop 28 under which condition the slot 30 will be so disposed so as to permit movement of said lever and plug valve 11 by either handle 19 to either of its different positions.

The pipe 23 connects the cylinder 20 to a pipe bracket 34 upon which is mounted a pilot valve device 35. The pipe bracket 34 is provided with a passage 36 open to pipe 23, a passage 37 open to the brake pipe 4, and two other passages 38 and 39. In the structure shown in Fig. 1 the passage 38 is open to atmosphere while the passage 39 is open to a fluid pressure supply pipe 40, while in the structure shown in Fig. 2 these connections are just reversed, in that passage 38 is open to the fluid pressure supply pipe 40 and passage 39 is open to atmosphere. The pipe 40 may be supplied with fluid under pressure from any suitable source, such as the auxiliary reservoir.

The pilot valve device 35 comprises a movable abutment preferably in the form of a flexible diaphragm 41 open at one side to a pressure chamber 42 which is connected to brake pipe 4 through the bracket passage 37. At the opposite side of diaphragm 41 is a non-pressure chamber 43 open to atmosphere through a passage 44 and containing a diaphragm follower 45 slidably mounted in the casing and engaging the adjacent side of said diaphragm. Projecting from the follower 45 in a direction away from diaphragm 41 is a rod 46. The rod 46 extends through a bore in a partition wall 47 into a chamber 48, said rod having sliding contact with the wall of said bore for minimizing leakage of fluid under pressure from the latter chamber to chamber 43. A spring 49 contained in chamber 43 acts on the follower 45 with a chosen pressure for urging diaphragm 41 to the position shown on the drawing defined by contact thereof with the casing.

The chamber 48 is open to the bracket passage 39 and contains a valve 50 having a hook 51 disposed in a slot in the adjacent end of rod 46 for moving said valve with said rod. The valve 50 has a fluted stem 52 slidably mounted in an axial bore 53 provided in a plunger 54. The plunger 54 is slidably mounted in the casing and is provided on the end opposite the valve 50 with a valve 55 contained in a chamber 56 and arranged to control communication between said chamber and an annular groove 57 provided around the plunger at the seating side of the valve. The chamber 56 is open to the bracket passage 36 while the annular groove 57 is open to the bracket passage 38. Within the plunger 54 the axial bore 53 opens to another axial bore 58 which opens through the valve 55 to chamber 56. A spring 59 contained in chamber 56 acts on the valve 55 for urging it to its seat.

The operation of the equipment shown in Fig. 1 of the drawings is as follows:

When the brake equipment including the auxiliary and emergency reservoirs is charged up to normal pressure by reason of charging the brake pipe 4 to normal pressure in the usual manner, the pressure of fluid in chamber 42 will increase with that in the brake pipe 4. When the brake pipe pressure and the pressure in chamber 42 are thus increased to some chosen degree, such as 20 pounds, the diaphragm 41 will deflect against spring 49 and actuate rod 46 to seat valve 50 against the adjacent end of plunger 54 and then actuate said plunger to open the valve 55. With the valve 55 open pressure chamber 22 in the cylinder 20 will be open to atmosphere past said valve and through the bracket passage 38 to permit spring 27 to actuate piston 21 and thereby rod 29 to move the plug valve 11 and operating lever 12 to their normal or application position, in which they are shown in the drawing, for establishing communication through the brake cylinder pipe 8 between the AB control valve and the brake cylinder device 9 for rendering said control valve operative to control supply and release of fluid under pressure to and from said brake cylinder device in the usual manner. The pressure of spring 27 on the piston 21 is such as to prevent operation of lever 12 by a trainman operating either lever 19, when the pressure chamber 22 is vented as just described, to thereby insure that the plug valve 11 will not accidentally or maliciously be turned from its normal position during operation of the vehicle in a train.

Now assume that the vehicle is cut out of a train for switching operations or the like under which condition the brake pipe 4 will be vented and the AB control valve will be in emergency position establishing communication between the auxiliary and emergency reservoirs and the brake cylinder device 9 through pipe 8, whereupon the fluid pressure in said reservoirs will equalize into said brake cylinder device for effecting an emergency application of brakes on the vehicle.

When the brake pipe 4 is completely vented as just described the pressure of fluid in diaphragm chamber 42 of the pilot valve device 35 will reduce with that in the brake pipe 4 to atmosphere and permit spring 49 to deflect the diaphragm 41 to the position in which it is shown in the drawing, said spring also actuating rod 46 to pull valve 50 out of seating engagement with plunger 54 and to permit actuation of said plunger by spring 59 to seat valve 55. With the valve 55 seated pressure chamber 22 in the cylinder 20 is disconnected from the atmospheric passage 38 in bracket 34 and opened through the bores 58 and 53 in the plunger 54 and past the open valve 50 to chamber 48 which is supplied with fluid under pressure from the auxiliary reservoir, whereupon such fluid will flow to pressure chamber 22 and therein act on piston 21 to move it against spring 27 into contact with stop 33. This will move the part 31 of the piston rod 29 away from the plug valve operating lever 12.

Now in order to release the brakes on the vehicle to permit movement thereof for switching or the like, a trainman will operate either lever 19 and thereby shaft 18 and lever 17 to their brake release position for thereby operating lever 12 to turn the plug valve 11 to its brake release position for closing communication between the AB control valve and the brake cylinder device 9 and for opening said brake cylinder device to atmosphere through the cavity 15 and port 13 in said plug valve and thence through the atmospheric port 14. With the brake cylinder device 9 thus disconnected from the AB control valve and open to atmosphere, fluid under pressure will be released from said brake cylinder device to release the brakes on the vehicle, while holding the fluid pressure still remaining in the auxiliary and emergency reservoirs.

If subsequently the trainman desires to reapply the brakes he will move an operating lever 19 to its application position for thereby operating the plug valve 11 to the normal position shown in the drawing for reestablishing communication between the auxiliary and emergency reservoirs and the brake cylinder device, whereupon the pressure of fluid in said reservoirs will equalize into said device for reapplying the brakes on the vehicle. If the operator then desires to again release the brakes he will move an operating handle 19 to its release position for thereby closing communication between the auxiliary and emergency reservoirs and the brake cylinder device and for opening the brake cylinder device to atmosphere for thereby again releasing the brakes on the vehicle while holding the remaining fluid pressure in the auxiliary and emergency reservoirs.

With the brake pipe 4 vented the trainman may, in the manner just described, release an application of brakes on the vehicle and reapply the brakes and continue such operation as long as sufficient pressure of fluid remains in the auxiliary and emergency reservoirs for operating the brake cylinder device 9.

When the vehicle is again cut into a train and the brake pipe 4 is recharged the pilot valve device 35 will again operate, when the pressure of fluid in chamber 42 is increased to a degree sufficient to overcome spring 49, to seat the valve 50 therein and open the valve 55, for thereby again opening pressure chamber 22 in the cylinder 20 to atmosphere, whereupon spring 27 will return the piston 21 to the position in which it is shown in the drawing in contact with stop 28. If the lever 12 and plug valve 11 are in the application position shown in the drawing, this movement of the piston 21 will merely be relative to said lever and valve, but in case the plug valve 11 is in its brake release position this operation of said piston by spring 27 will automatically return said valve to its application position for insuring that the brake cylinder device 9 will be connected to the AB control valve to provide subsequent control of the brakes on the vehicle by operation of said control valve in response to variations in pressure of fluid in the brake pipe 4, in the usual manner.

In the structure shown in Fig. 2 the cylinder 20 is arranged on the opposite side of the plug valve operating lever 12 to that shown in Fig. 1, whereby fluid pressure is required in pressure chamber 22, when the brake pipe 4 is charged, for actuating piston 21 against spring 27 for moving the plug valve operating lever 12 to its normal position and for holding it in such position during operation of the vehicle in the train. Upon release of fluid pressure from the pressure chamber 22 the spring 27 will move piston 21 to the position in which it is shown in the drawing to permit movement of the plug valve operating lever 12 to its different positions by a trainman operating lever 19. To thus control the cylinder 20 in the structure shown in Fig. 2 the fluid pressure supply pipe 40 is connected to the bracket passage 38, while the passage 39 is open to atmosphere, the connections to these passages being just the reverse of the connections in the structure shown in Fig. 1. With this arrangement when the brake pipe 4 is charged and the pilot valve device 35 is operated to establish communication between passages 36 and 38 fluid under pressure will be supplied to the pressure chamber 22 in the cylinder device 20 for actuating piston 21 to move the plug valve 11 and its operating lever 12 to and then hold them against movement out of their normal or application position. However, when the brake pipe is vented the operation of the pilot valve device 35 will connect the pressure chamber 22 to atmosphere through the bracket passage 39 to permit movement of piston 21 to the position in which it is shown in the drawing for permitting operation of lever 12 and plug valve 11 to their different positions by either trainman's operating lever 19.

It will thus be seen that in the structures shown in Figs. 1 and 2, the cylinders 20 operate just oppositely, that is, in the structure shown in Fig. 1 the piston 21 is operative by spring 27 to move the plug valve 11 to and then hold it in its normal position upon charging of brake pipe 4 and during operation in a train, while in the structure shown in Fig. 2 fluid pressure in pressure chamber 22 is required for moving said plug valve to and for holding it in its normal position, under this condition.

It will be noted that in the drawings the pilot valve device 35 is shown at a much larger scale than the other parts of the equipment. Actually the pilot valve device 35 will be much smaller than the cylinder device 20, and chamber 42 above diaphragm 41 in said pilot valve device will be only a fraction of the volume of pressure chamber 22 in the cylinder 20. The pilot valve device 35 is provided for controlling the supply and release of fluid under pressure to and from the relatively large pressure chamber 22 while the relatively small chamber 42 of the pilot valve device is open to brake pipe 4.

It is undesirable to connect any unnecessary volume to the brake pipe 4 of a vehicle due to the fact that such volume will slow down the serial propagation of a reduction in brake pressure through a train, and if the volume is sufficiently large, as in the case of pressure chamber 22 in the cylinder 20, such propagation may be prevented. Where it is necessary, however, to connect to the brake pipe 4 a volume to obtain a desired control operation it is desirable that such volume be held to a very minimum, like diaphragm chamber 42 in the pilot valve device, in order to insure that serial propagation of a reduction in brake pipe pressure will occur throughout an entire train. This is the reason for using the pilot valve device 35 with its relatively small pressure chamber 42 open to the brake pipe 4 for controlling the pressure of fluid in the relatively large pressure chamber 22 of the cylinder 20, instead of opening said pressure chamber 20 direct to brake pipe 4.

If desired, a snap-acting valve device 60, shown in Fig. 3 of the drawing, may be employed in place of the pilot valve device 35 in the equipment shown in Fig. 2 of the drawing. The valve device 60 comprises a casing containing a valve piston 61 one side of which is arranged to cooperate with an annular seat 62 formed on the casing. The seat 62 encircles a passage 63 which is open to brake pipe 4, and surrounding said seat is an annular cavity 64 which is open through a passage 65 and past a check valve 66 therein to a cavity 67 in the casing. The cavity 67 is open through a passage 68 to pipe 23 leading to the cylinder 20.

At the opposite side of valve piston 61 is a chamber 69 which is constantly open to atmosphere through a passage 70. When the valve piston 61 is seated on seat 62, chamber 69 is also open to cavity 67 but said piston is adapted to move away from said seat into contact with a seat 71 in the casing for closing this communication. A spring 72 contained in chamber 69 and supported at one end on the casing bears at its opposite end against the valve piston 61 for urging it to its seat against seat 62.

The pressure of spring 72 on the valve piston 61 is such, when said valve piston is in contact with seat 62, as to require a certain increase in pressure in the brake pipe 4 and thereby in passage 63, such as to 60 or 65 pounds, to provide sufficient force on said valve piston within said seat to move said valve piston against spring 72 into contact with its seat 71. When the valve piston 61 is out of contact with seat 62 and its full lower area is subject to pressure of fluid from the brake pipe 4, said pressure must be reduced to some chosen low degree, such as 20 pounds, to permit movement of said valve piston by spring 72 out of contact with seat 71 and into contact with seat 62.

In operation, when the brake pipe 4 and other parts of the equipment are fully charged with fluid under pressure, the valve piston 61 will be in its upper position in contact with seat 71 for establishing communication between the brake pipe 4 and annular cavity 64 through the passage 63. With this communication open fluid from the brake pipe will flow through annular cavity 64 to passage 65 and then past the check valve 66 to cavity 67 and from the latter cavity through passage 68 and pipe 23 to pressure chamber 22 in the cylinder 20 and actuate piston 21 against spring 27 into contact with stop 33 for thereby actuating the piston rod 29 to move, if necessary, the plug valve 11 to its normal position.

When the pressure in the brake pipe 4 is reduced for effecting an application of brakes, the valve piston 61 and check valve 66 will prevent back flow of fluid under pressure from the pressure chamber 22 and cylinder 20 to the brake pipe 4, whereby said pressure chamber is effectively isolated from the brake pipe during such operation so as not to interfere with the serial propagation of a reduction in brake pipe pressure through a train.

Assuming that the pressure normally carried in the brake pipe 4 is 70 pounds and that a 20 pound reduction therein to 50 pounds is required for effecting a full-service application of brakes, it will be seen that since the brake pipe pressure must be reduced to a lower degree, such as to 20 pounds before the valve piston 61 can move out of contact with seat 71, that the pressure of fluid will be maintained in pressure chamber 22 of the cylinder 20 to hold the plug valve 11 in the position opening the AB control valve to the brake cylinder device 9 for insuring normal control of the brakes on the vehicle. The pilot valve devices 35 shown in Figs. 1 and 2 operate at this same low brake pipe pressure for the same reasons.

In case of an emergency reduction in pressure and thus complete venting of fluid under pressure from the brake pipe 4 to atmosphere, as when a vehicle is set out of a train for switching operations or the like, the valve piston 61 will be moved by spring 72 into contact with seat 62 when the pressure of fluid in the brake pipe 4 is reduced to the relatively low degree above mentioned. With the valve piston 61 thus out of contact with its seat 71 pressure chamber 22 in the cylinder 20 will be opened to atmosphere through cavity 67 and passage 70. The piston 21 will then be moved by spring 27 to the position in which it is shown in Fig. 2 of the drawing for permitting movement of the plug valve 11 to its different positions by the trainman's handle 19, for either releasing the brakes on the vehicle without losing the fluid pressure remaining in the auxiliary and emergency reservoirs, or for reapplying the brakes by such fluid under pressure, in the same manner as before described.

When a vehicle is again cut into a train and the brake pipe and brake equipment are recharged with fluid under pressure, the valve piston 61 will move from contact with seat 62 into contact with seat 71 when the brake pipe pressure is increased to the desired pressure, such as 60 pounds, whereupon fluid under pressure from the brake pipe will flow to pressure chamber 22 and actuate piston 21 to move the plug valve 11 to its normal position, if not already in that position. Movement of the valve piston 61 as just described is delayed until the brake pipe pressure is increased to the degree mentioned, in order to prevent the pressure chamber 22 being connected to the brake pipe before the AB control valve operates to open the brake cylinder pipe 8 to atmosphere, otherwise the volume of chamber 22 would unnecessarily delay the increase in brake pipe pressure required to obtain a release of brakes on the vehicle and in a train.

Summary

It will now be seen that I have provided a mechanism whereby a trainman, either while riding a railroad vehicle or from the ground and with the brake pipe completely vented, may release an application of brakes on the vehicle without dissipating the fluid pressure remaining in the fluid pressure storage reservoir or reservoirs thereon, and whereby he may reapply the brakes by such fluid under pressure if such is desired, and which is automatically operative upon recharging of the brake pipe to connect the brake cylinder device to the brake controlling valve device on the vehicle, if not already connected, for insuring that the brakes on the vehicle will be applied along with those on other vehicles in a train upon a subsequent reduction in pressure in the brake pipe.

Having now described my invention, what I claim as new and desire to secure by Letters Patent is:

1. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, a structure for moving said valve means to and for holding said valve means in said normal position, and pressure responsive means operable by pressure of fluid in said brake pipe to effect operation of said structure and operative upon venting of fluid under pressure from said brake pipe to render said structure ineffective.

2. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to pressure of said spring means and opposing pressure of fluid in a pressure chamber for selectively moving said valve means to and for holding same in said normal position or for permitting manual movement thereof to its different positions according to the presence or absence of fluid under pressure in said pressure chamber, and valve means controlled by brake pipe pressure for controlling the fluid under pressure in said pressure chamber according to the presence or absence of fluid under pressure in said brake pipe.

3. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to pressure of said spring means and opposing pressure of fluid in a pressure chamber for selectively moving said valve means to and for holding same in said normal position or for permitting manual movement thereof to its different positions according to the presence or absence of fluid under pressure in said pressure chamber, a second valve means for supplying fluid under pressure to said pressure chamber and for releasing fluid under pressure from said pressure chamber, and means operative according to the presence or absence of fluid under pressure in said brake pipe for controlling said second valve means.

4. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to pressure of said spring means and opposing pressure of fluid in a pressure chamber for selectively moving said valve means to and for holding same in said normal position or for permitting manual movement thereof to its different positions according to the presence or absence of fluid under pressure in said pressure chamber, and a second valve means controlled by pressure of fluid in said brake pipe operative by a chosen pressure therein to supply fluid under pressure from said brake pipe to said pressure chamber and operative upon a reduction in brake pipe pressure to a chosen lower degree to establish a fluid pressure release communication from said chamber.

5. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to pressure of said spring means and opposing pressure of fluid in a pressure chamber for selectively moving said valve means to and for holding same in said normal position or for permitting manual movement thereof to its different positions according to the presence or absence of fluid under pressure in said pressure chamber, a second valve means for supplying fluid under pressure from said reservoir to said pressure chamber and for releasing fluid under pressure from said pressure chamber, and means operative according to the presence or absence of fluid under pressure in said brake pipe for controlling said second valve means.

6. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means operable by said spring means to move said valve means to said normal position and movable against said spring means relative to said valve means upon supply of fluid under pressure to a pressure chamber to render said valve means operable by said manually operable means, and means operable by fluid under pressure in said brake pipe to open said pressure chamber to atmosphere and operable upon venting of fluid under pressure from said brake pipe to supply fluid under pressure to said pressure chamber.

7. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means operable by said spring means to move said valve means to said normal position and movable against said spring means relative to said valve means upon supply of fluid under pressure to a pressure chamber to render said valve means operable by said manually operable means, valve means controlling communication between said pressure chamber and said reservoir and atmosphere, and means operable by fluid under pressure in said brake pipe to effect operation of said valve means to open said pressure chamber to atmosphere and operable upon venting of fluid under pressure from said brake pipe to effect operation of said valve means to open said pressure chamber to said reservoir.

8. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to opposing pressure of said spring means and pressure of fluid in a pressure chamber and operable by the pressure of fluid in said chamber to move said valve means to said normal position and operable by said spring means upon release of fluid under pressure from said pressure chamber to render said valve means operable by said manually operable means, and means operable by fluid under pressure in said brake pipe to supply fluid under pressure to said pressure chamber and operable upon venting of fluid under pressure from said brake pipe to open said pressure chamber to atmosphere.

9. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to opposing pressure of said spring means and pressure of fluid in a pressure chamber and operable by the pressure of fluid in said chamber to move said valve means to said normal position and operable by said spring means upon release of fluid under pressure from said pressure chamber to render said valve means operable by said manually operable means, a second valve means controlling communication between said pressure chamber and said reservoir and atmosphere, and means operable by fluid under pressure in said brake pipe to effect operation of said second valve means to open said pressure chamber to said reservoir and operable upon venting of fluid under pressure from said brake pipe to effect operation of said valve means to open said pressure chamber to atmosphere.

10. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to opposing pressure of said spring means and pressure of fluid in a pressure chamber and operable by the pressure of fluid in said chamber to move said valve means to said normal position and operable by said spring means upon release of fluid under pressure from said pressure chamber to render said valve means operable by said manually operable means, snap-acting valve means operative upon an increase in pressure of fluid in said brake pipe to a chosen degree to establish communication between said brake pipe and pressure chamber and operative upon a reduction in pressure in said brake pipe to a lower degree to close said communication and open said pressure chamber to atmosphere, and a check valve in said communication for preventing reverse flow of fluid under pressure from said pressure chamber to said brake pipe.

11. A brake release and application mechanism for use with a vehicle fluid pressure brake equipment of the type comprising a brake pipe, a device operable by fluid under pressure to effect an application of brakes on said vehicle and operable upon release of fluid under pressure to effect a release of the vehicle brakes, at least one fluid pressure storage reservoir, and a brake controlling valve device operative upon a reduction in brake pipe pressure to establish a fluid pressure supply communication from said reservoir to said fluid pressure operable device to permit equalization of the pressures therein and operable upon an increase of brake pipe pressure to release fluid under pressure from said communication, said mechanism comprising valve means having a normal position for opening said communication and a brake release position for closing said communication and for releasing fluid under pressure from said fluid pressure operable device, manually operable means for moving said valve means to its different positions, spring means, movable abutment means subject to opposing pressure of said spring means and pressure of fluid in a pressure chamber and operable by the pressure of fluid in said chamber to move said valve means to said normal position and operable by said spring means upon release of fluid under pressure from said pressure chamber to render said valve means operable by said manually operable means, other spring means, and a valve piston subject on one side to pressure of said other spring means and on the opposite side to pressure in said brake pipe and movable against said other spring means to a normal position upon an increase in pressure in said brake pipe for establishing a communication from said brake pipe to said pressure chamber, a check valve in said communication between said valve piston and pressure chamber for preventing reverse flow of fluid under pressure through said communication, said other spring means being operative upon a reduction in brake pipe pressure to actuate said valve piston to another position for closing said communication and for opening said pressure chamber to atmosphere; and means for reducing the area of said valve piston subject to pressure of fluid in said brake pipe when in said other position to less than subject in said normal position.

EARLE S. COOK.

REFERENCES CITED

The following references are of record in the file of this patent:

UNITED STATES PATENTS

| Number | Name | Date |
|---|---|---|
| 2,350,242 | McAlpine | May 30, 1944 |